United States Patent

Ootsuka et al.

[11] Patent Number: 5,264,748
[45] Date of Patent: Nov. 23, 1993

[54] AXIAL-FLOW FAN MOTOR

[75] Inventors: Shigeru Ootsuka, Yonago; Naoki Nakada, Saihaku; Ryoji Saneshige, Yonago, all of Japan

[73] Assignee: Matsushita Electric Industrial Co., Ltd., Kadoma, Japan

[21] Appl. No.: 9,441

[22] Filed: Jan. 27, 1993

Related U.S. Application Data

[63] Continuation of Ser. No. 702,907, May 21, 1991, abandoned.

[30] Foreign Application Priority Data

May 24, 1990 [JP] Japan ................... 2-135070

[51] Int. Cl.[5] ................. H02K 7/08; H02K 7/14; F16C 33/10
[52] U.S. Cl. ....................... 310/90; 384/902; 310/67 R
[58] Field of Search ........... 310/62, 63, 67 R, 90; 384/223, 240, 243, 279, 322, 368, 420, 425, 902

[56] References Cited

U.S. PATENT DOCUMENTS

| | | | |
|---|---|---|---|
| 3,786,290 | 1/1974 | Papst et al. | 310/67 R |
| 4,130,770 | 12/1978 | Wrobel | 310/67 R |
| 4,326,758 | 4/1982 | Nozue et al. | 384/368 |
| 4,466,165 | 8/1984 | Otto | 310/90 |
| 4,612,468 | 9/1986 | Sturm et al. | 310/67 R |
| 4,613,778 | 9/1986 | Wrobel et al. | 310/67 R |
| 4,694,210 | 9/1987 | Elliott et al. | 310/67 R |
| 4,783,608 | 11/1988 | Gruber et al. | 310/90 |
| 4,810,105 | 3/1989 | Arlott et al. | 384/97 |
| 4,825,114 | 4/1989 | Ohtsuka et al. | 310/90 |
| 5,076,716 | 12/1991 | Mizobuchi et al. | 384/902 |

FOREIGN PATENT DOCUMENTS

| | | | |
|---|---|---|---|
| 0000623 | 1/1983 | Japan | 384/322 |
| 0172012 | 7/1988 | Japan | 384/420 |

*Primary Examiner*—Steven L. Stephan
*Assistant Examiner*—C. LaBalle
*Attorney, Agent, or Firm*—Cushman, Darby & Cushman

[57] ABSTRACT

A sleeve-type plain bearing of an axial-flow fan motor, made of sintered oilless metal, for bearing a rotation of a rotor has plural protrusions on a thrust bearing surface in a direction vertical to an axial direction of the rotor, and thereby lubricant impregnated in the sintered oilless metal is always supplied in spaces formed by the thrust bearing surface, the protrusions and a thrust plate provided on the rotation shaft.

9 Claims, 8 Drawing Sheets

AXIAL-FLOW FAN MOTOR

This is a continuation of application Ser. No. 07/702,907, filed on May 21, 1991, now abandoned.

BACKGROUND OF THE INVENTION

1. Field of the Invention

The present invention relates to an axial-flow fan motor to be used for cooling electronic devices, and especially relates to an improvement of bearing parts which receive a thrust load acting on a rotor of the motor.

2. Description of the Prior Art

A constitution of a conventional commutatorless axial-flow fan motor is described referring to FIG. 8, which is a cross-sectional side view showing the constitution of the conventional commutatorless axial-flow fan motor.

As shown in FIG. 8, the conventional axial-flow fan motor comprises a stator assembly 6, a housing 7 and a rotor assembly 11. The stator assembly 6 has insulators 1 which are made of thermoplastic resin, a stator core 2 which is insulated by the insulators 1, driving coils 3 which are wound around arm parts of the stator core 2, a circuit substrate 4 on which a driving circuit is provided and plural connecting pins 5 which are soldered on the circuit substrate 4 for connecting the driving circuit and the driving coils 3.

The housing 7 has a short cylinder shape and has a motor holder 7b which is supported by plural spokes 7a on the center axis part of the cylindrical shape of the housing 7. The housing 7 is formed by resin molding with the motor holder 7b. The motor holder 7b has a tube-shaped bearing holding part 8, which is, for example, made of metal and inserted in the center axis part in the resin molding process of the housing 7. The assembled stator assembly 6 is fit and fixed on the outer face of the bearing holding part 8 by adhesive 9.

Ball bearings 13 and a coil spring 14 are fit in the inner hole of the bearing holding part 8 for bearing a rotor shaft 12 of the rotor assembly 11. The coil spring 14 supplies a pre-load on the ball bearings 13. The rotor assembly 11 has plural blades 10 on its outer periphery.

The above-mentioned conventional axial-flow fan motor, however, is expensive and complex because it uses the ball bearings 13 for bearing the rotor shaft 12 and the bearings 13 need a coil spring 14 for supplying the pre-load.

Furthermore, the axial-flow fan motor is generally used in a high temperature environment. In such a case, base oil of a grease which is used as a lubricant of the ball bearings 13 is gradually evaporated and the viscosity of the lubricant becomes high. As a result, the lubrications between balls and an inner ring and/or balls and an outer ring of the ball bearings 13 are damaged and the ball bearings 13 generate high noise due to the slip of the balls and the rings. In particular, the viscosity of the lubricant becomes acceleratively high with a decrease of the base oil of the lubricant in the ball bearing and the bearing also becomes noisy.

On the other hand, it is considered whether a sleeve type plain bearing (not shown in the figure) made of sintered oilless metal which has many small pores and oil which is pressurized and impregnated can be replaced with the ball bearing or not. In such a case, an initial property of the plain bearing can be maintained even when the lubricant has been lost in some measure in comparison with the case of using the afore-mentioned ball bearing. Therefore, the noise due to the evaporation of the base oil of the lubricant, which is a problem in case of using the ball bearing, is not much of a problem in this case.

The sleeve-type plain bearing, however, has a problem in the way the thrust load is received by the plain bearing. Namely, in such an axial-flow fan motor, a relatively large thrust load is generated by a reaction of an air flow due to the rotation of the fan and is applied to the rotation shaft of the fan. In a constitution that the thrust load is directly received by an end face of the sleeve-type plain bearing and a washer provided on the rotation shaft of the fan (which are not shown in the figure since they are known in the art), a peripheral velocity on the peripheral part of the washer sliding on the end face of the bearing becomes very large and the friction loss damages the life of the bearing. In particular, the end face of the conventional sleeve-type plain bearing is made flat, so that the thrust load is received by the whole of the end face evenly. Thereby, circulation of the oil, contained in the sintered oilless metal due to a pumping operation which is a feature of the sintered oilless bearing, can not be expected. And the pressure durability against the thrust load of the conventional sleeve-type plain bearing is extremely reduced.

SUMMARY OF THE INVENTION

Purpose of the present invention is to solve the above-mentioned problems of the ball bearing and the sleeve-type plain bearing and to provide an improved axial-flow fan motor having a simple and compact constitution and serving in long life.

An axial-flow fan motor in accordance with the present invention comprises:

a cylindrical housing serving as an outer shell of the axial-flow fan motor;

a motor holder provided on the center part of the housing, held on the housing by plural spokes and having a cylindrical boss part;

sleeve-type plain bearing means provided on the boss part of the motor holder, for bearing a rotation shaft of a rotor and having at least three protrusions formed at a substantially equal angles on a thrust bearing surface (the axial end face of sleeve type plain bearing) thereof; and a thrust plate provided on the rotation shaft for sliding on the thrust bearing surface of the sleeve-type plain bearing.

In the above-mentioned axial-flow fan motor in accordance with the present invention, at least three protrusions are formed on the thrust bearing surface which is vertical to the orientation of the rotation shaft, and the thrust plate slides against the thrust bearing surface. Namely, the thrust plate contacts the protrusions (at rest condition). Thereby, the spaces, which are formed by the thrust bearing surface, the protrusions and the thrust plate, serve as oil sumps and the lubrication of the rotation shaft of the rotor by the oil is performed effectively. Furthermore, positive pressure and negative pressure due to the flow of the oil, which is generated by the rotation of the thrust plate with the rotation shaft, are generated in the vicinity of the boundaries of the contacting parts and non-contacting parts of the thrust plate to the protrusions. Thereby, the oil impregnated in the bearing is circulated and the lubrication property of the bearing and the rotation shaft of the rotor is improved (at rotating condition).

DESCRIPTION OF THE PREFERRED EMBODIMENTS

A preferred embodiment of an axial-flow fan motor in accordance with the present invention is described referring to FIGS. 1, 2A, 2B, 3, 3A, 4, 5, 6 and 7.

Figure 1:
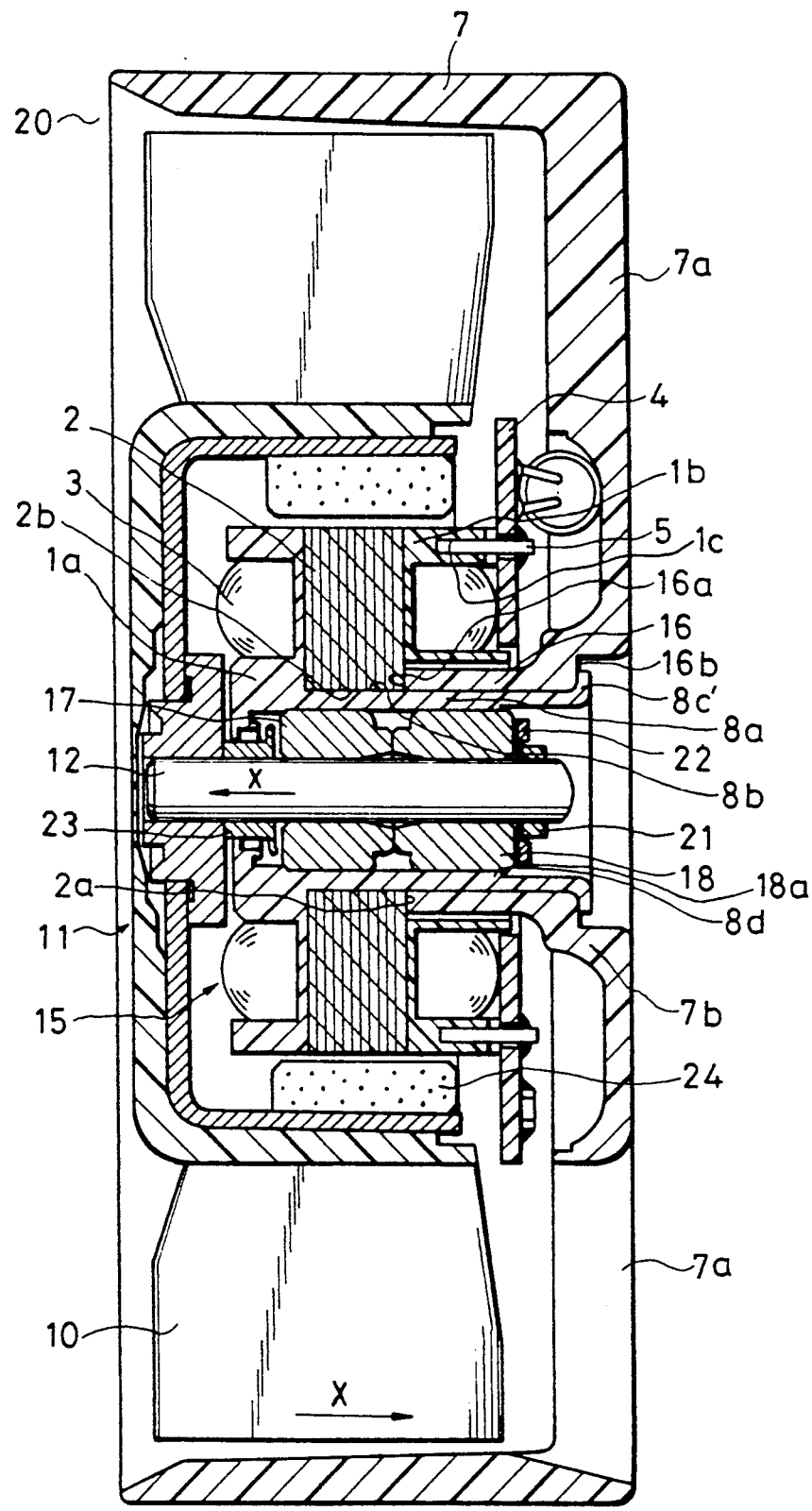
FIG. 1 is a cross-sectional side view showing a detailed constitution of a commutatorless-type axial-flow fan motor in accordance with the present invention.

FIG. 1 is a cross-sectional side view showing the detail constitution of the axial-flow fan motor in accordance with the present invention.

In FIG. 1, a short cylinder shaped housing 7, which serves as an outer shell of the axial-flow fan motor, has a motor holder 7b on the center axis part of the cylinder shape. The motor holder 7b is held by plural spokes 7a on the housing 7. The motor holder 7b has a tubular part 16 molded integral with the motor holder 7b. A cylinder-shaped bearing holding part 8a of a stator assembly 15 is press fit on the inner face of the tubular part 16. The stator assembly 15 is positioned on the tubular part 16 by contacting of an end face 2a of a stator core 2 on a first end face 16a of the tubular part 16.

Figure 2A:
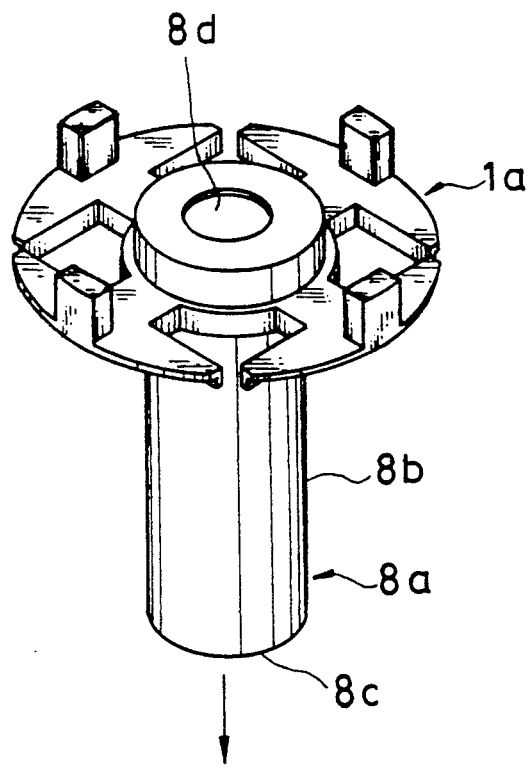
FIG. 2A is an exploded perspective view showing a stator of the commutatorless axial-flow fan motor shown in FIG. 1.
Figure 2A:
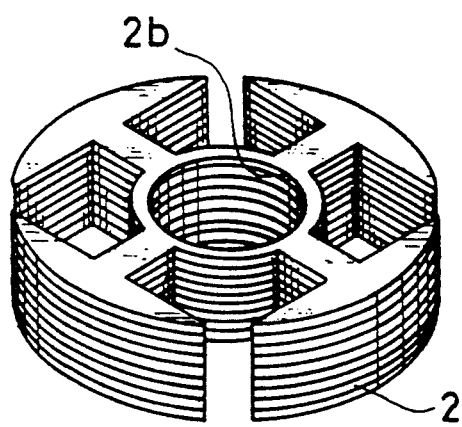
Figure 2A:
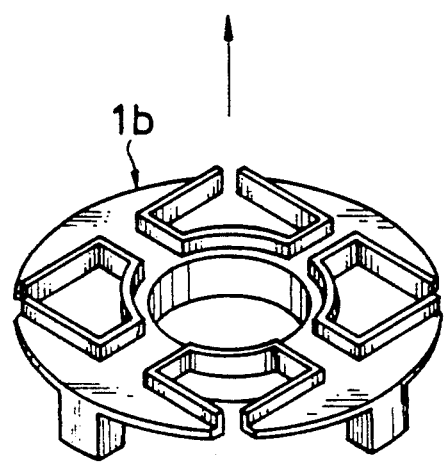
Figure 2B:
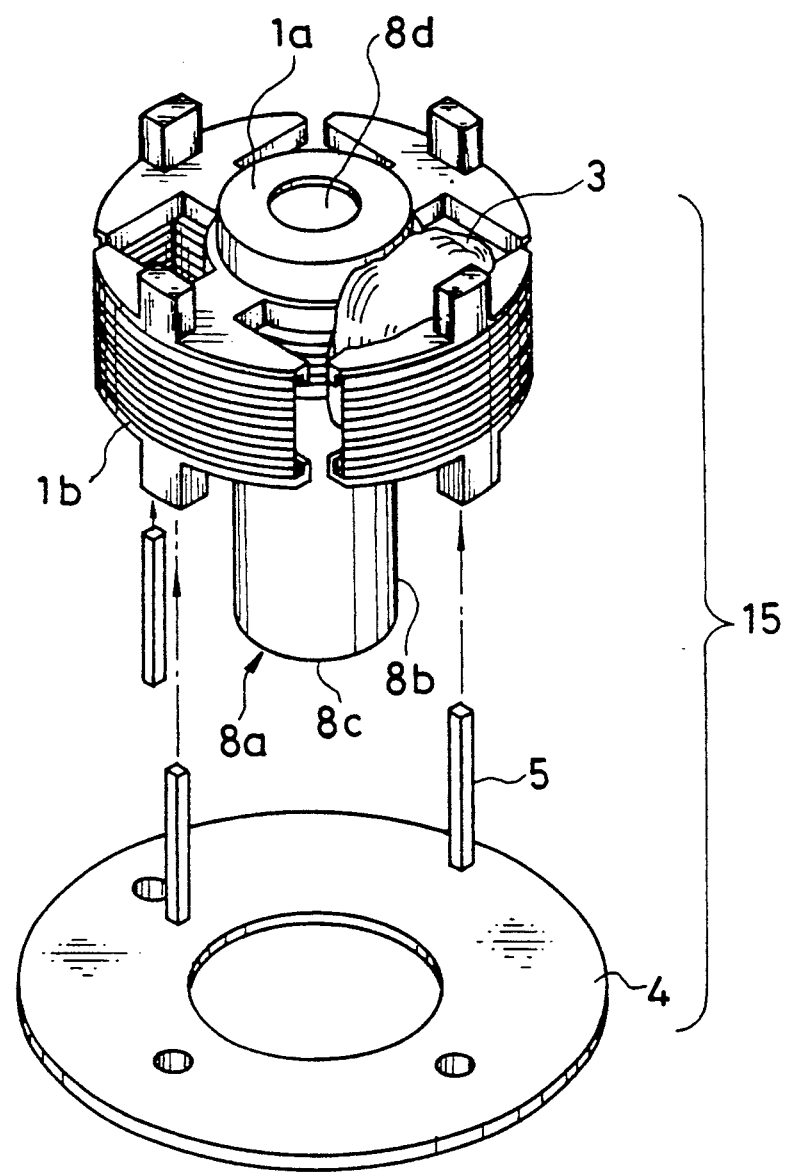
FIG. 2B is a perspective view showing an assembly of the stator shown in FIG. 2A.

FIG. 2A is an exploded perspective view showing the stator assembly 15 of the axial-flow fan motor in accordance with the present invention and FIG. 2B is a perspective view showing the assembled stator 15 (stator assembly).

In FIGS. 2A and 2B, a cylinder-shaped bearing holding part 8a is formed incorporated with an first insulator 1a which is to be located in a position facing to a fan rotor (rotor assembly) 11 (shown in FIG. 1). A center hole 2b of the stator core 2 is formed so as to be press fit on or loose fit on an outer wall 8b of the bearing holding part 8a. The stator core 2 is insulated by the first insulator 1a and a second insulator 1b from both sides. After that, in FIG. 2B, plural windings 3 are wound around arm parts of the insulated stator core 2. Plural (three) connecting pins 5 are fit in holes 1c (shown in FIG. 1) of the second insulator 1b and the connecting pins 5 are soldered on a circuit substrate 4. Thereby, the stator assembly 15 is assembled.

When the stator assembly 15 is incorporated into the motor holder 7a, a top part 8c of the tubular bearing holding part 8a of the stator assembly 15 juts out from a second end 16b of the tube-shaped part 16. The jutting top part 8c of the bearing holding part 8a is welded on the periphery of the second end 16b of the tube-shaped part 16 by ultrasonic welding or thermal compression bonding, and the stator assembly 15 is fixed on the motor holder 7b of the housing 7. An anchor 8c' of the bearing holding part 8a is formed by melting the jutting part 8c so that the diameter thereof is enlarged.

Thereafter, a sleeve-type plain bearings 17 and 18 are fit to the inner wall 8d of the bearing holding part 8a, and thereby a housing assembly 20 is assembled.

In this embodiment, the bearing holding part 8a is incorporated with the first insulator 1a, and the top part 8c of the bearing holding part 8a is welded on the second end 16b of the tube-shaped part 16, so that it can serve as a binding part for binding the stator assembly 15 to the motor holder 7a of the housing 7. Apart from the afore-mentioned embodiment, another embodiment of the stator assembly 15 can be proposed, wherein the bearing holding part 8a is incorporated with the second insulator 1b, and the second insulator 1b and the first insulator 1a are incorporated with the stator core 2 by the windings 3. In this embodiment, therefore, the tubular bearing holding part 8a can serve as the binding part for binding the stator assembly 15 to the motor holder 7a of the housing 7.

Furthermore, an oil thrower 23 is fixed to a rotation shaft 12 of the rotor assembly 11, and slidably engages with a hole of the first insulator 1a as shown in FIG. 1. A stop ring 21 is fixed to the shaft 12 in the opposite side to the oil thrower 23, rotatably holding a thrust plate 22 which slides on a thrust bearing surface of the sleeve-type plain bearing 18.

The rotor assembly 11 has plural blades 10 on its outer periphery and magnet 24 which has plural magnetized sections on its inner periphery. The magnet 24 is provided so as to face to the outer periphery of the stator core 2.

Figure 3:
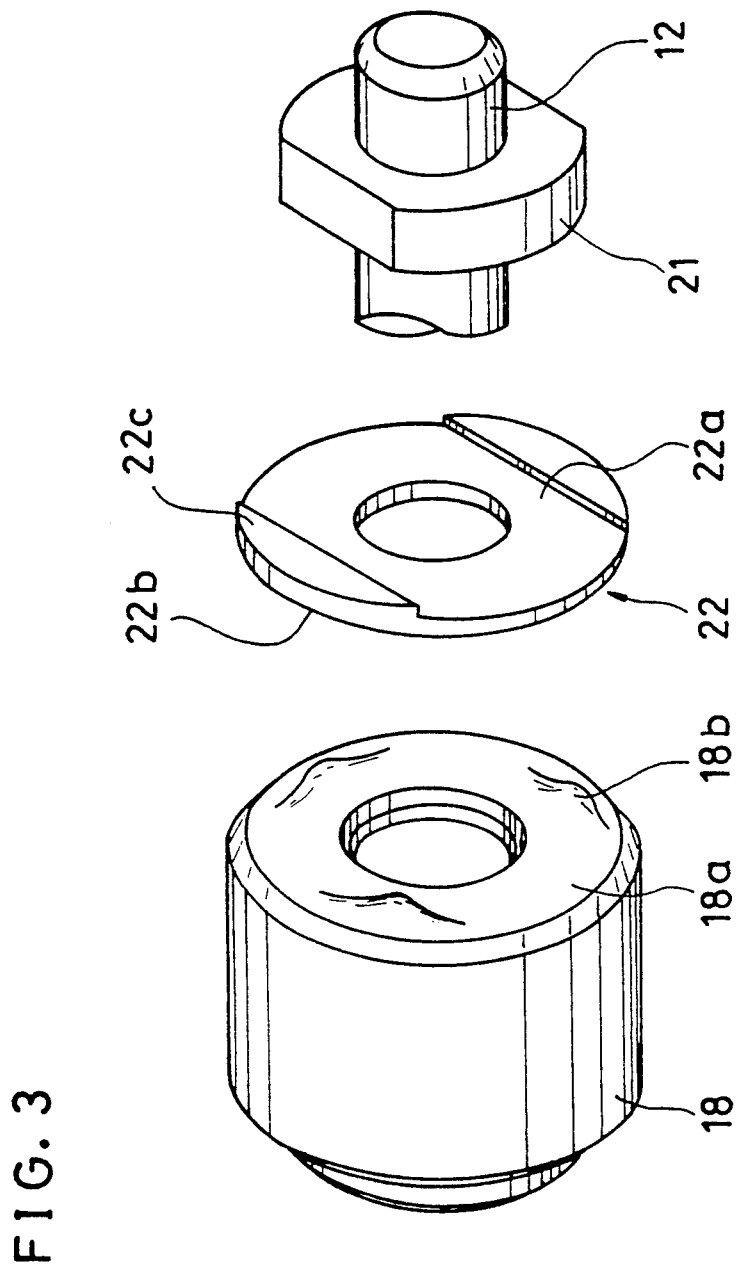
FIG. 3 is an exploded and enlarged upside-down perspective view showing an improved thrust bearing in accordance with the present invention shown in FIG. 1.
Figure 3A:
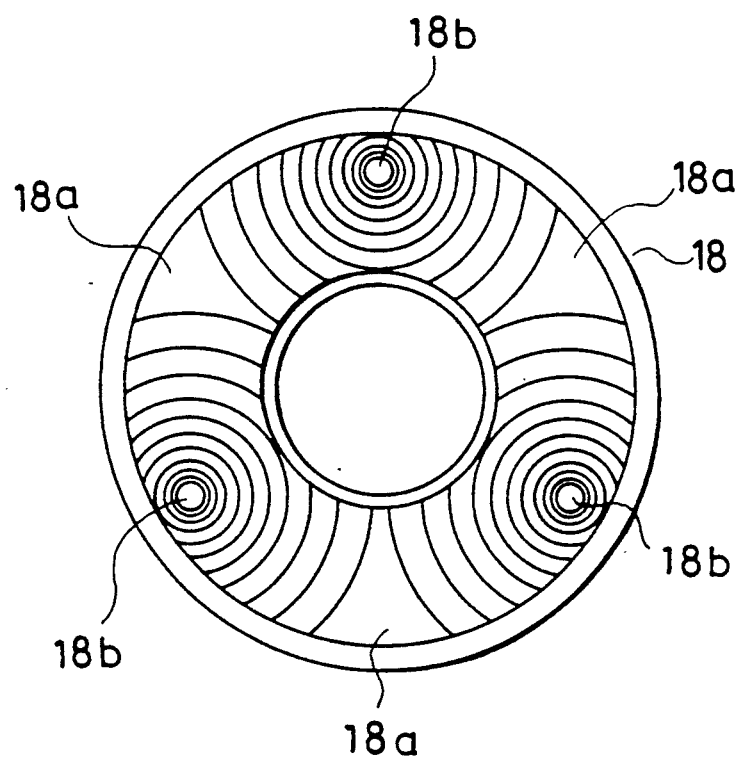
FIG. 3A is a contour map of a thrust bearing surface of the bearing shown in FIG. 3.

FIG. 3 is an exploded and enlarged perspective view showing a detailed consititution of the thrust bearing part of the sleeve-type plain bearing 18. FIG. 3A is a contour map of a thrust bearing surface 18a shown in FIG. 3. The sleeve-type plain bearing 18 is made of a known sintered oilless metal in Fe-Cu system. On the thrust bearing surface 18a which is on an end part of the sleeve-type plain bearing 18, and which is substantially vertical to the axis of the rotation shaft 12, has at least three protrusions 18b having a height in a range of $10 \sim 30$ μm and disposed on a circle cocentric to the axis at a predetermined even angles. Each protrusion 18b has a three dimensional shape as shown by a contour map of FIG. 3A.

The thrust plate 22 is made of carbon tool steel. A sliding surface 22b which slides and contacts on the thrust bearing surface 18a of the sleeve-type plain bearing 18 is finished to a high degree of smoothness and flatness. On a surface 22c opposite to the sliding surface 22b of the thrust plate 22, a concave part 22a for fitting to the stop ring 21 is formed. Thereby, the thrust plate 22 is rotated with the rotation shaft 12 via the stop ring 21.

In the above-mentioned axial-flow fan motor in accordance with the present invention, when an electric power is supplied to the driving coils 3, the rotor assembly 11 is rotated. Thereby, an air current flows in a direction shown by arrow X in FIG. 1. At this time, a reaction force caused by the air current is generated on the rotation shaft 12 as shown by arrow X'. Thereby, the thrust plate 22 is pressed to the thrust bearing surface 18a of the bearing 18. The bearing 18 serves as a thrust bearing for receiving the thrust load of the rotor assembly 11.

Furthermore, a magnetic thrust load due to the magnetic absorption force between the rotor assembly 11 and the stator assembly 15 for vibration control of the rotor assembly 11 is previously applied on the thrust bearing surface 18a of the bearing 18 and the thrust plate 22.

Figure 4:
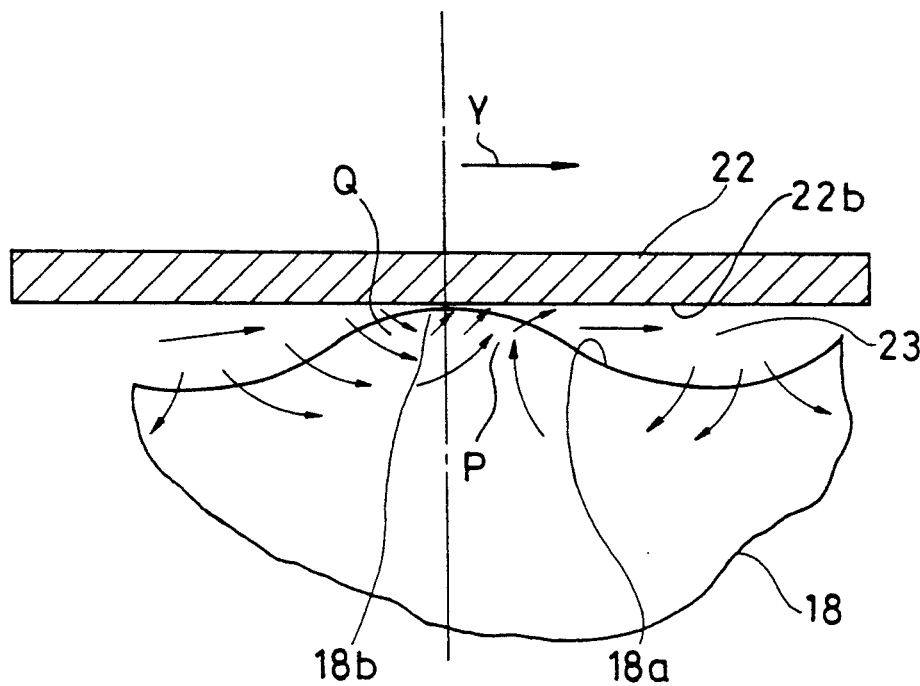
FIG. 4 is a schematic cross-sectional view showing principal flows of the oil in the thrust bearing in accordance with the present invention.
Figure 5:
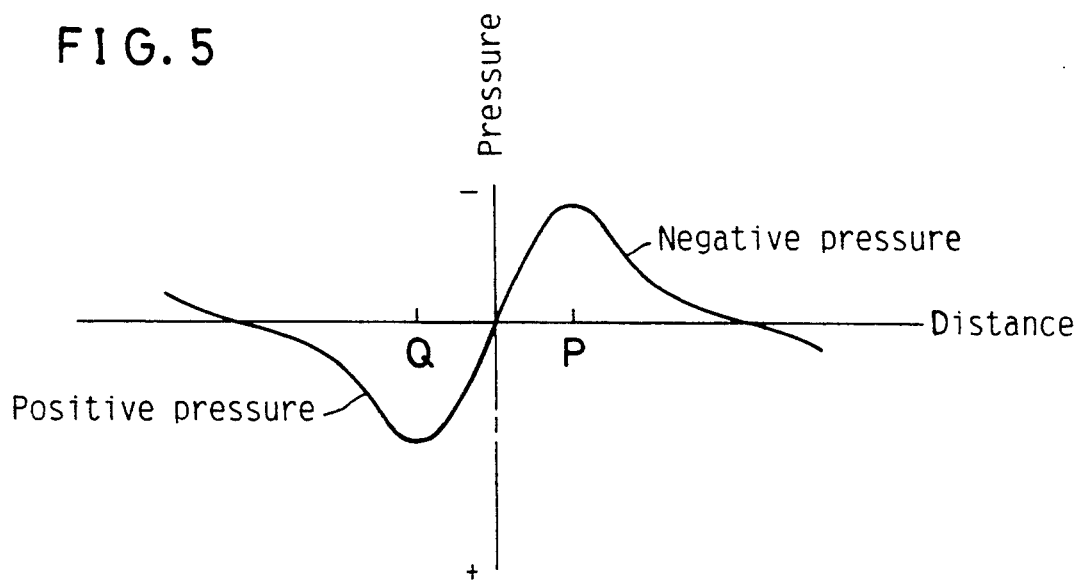
FIG. 5 is a graph showing pressure distribution in the thrust bearing in accordance with the present invention shown in FIG. 4.

Flows of the oil when the rotor assembly 11 is rotated are described referring to FIGS. 4 and 5. FIG. 4 shows the details of the principle of the oil flow between the thrust plate 22 and the thrust bearing surface 18a having the protrusions 18b of the bearing 18. FIG. 5 shows the pressure distribution in the thrust bearing shown in FIG. 4.

As the protrusions 18b (only one protrusion 18b is shown in the figure) are formed on the thrust bearing surface 18a of the bearing 18, the spaces 23 are formed between the thrust plate 22 and the thrust bearing surface 18a. At this time, the pressure distribution on the thrust bearing surface 18a is shown in FIG. 5. When the thrust plate 22 is rotated in a direction shown by arrow Y in FIG. 4, the positive pressure part shown by arrow Q and the negative pressure part shown by arrow P in FIG. 4 are generated in the flows of the oil in the vicinity of the thrust bearing surface 18a. Therefore, the oil impregnated in the sintered oilless metal of the bearing 18 is circulated. By such phenomena, the oil impregnated in the bearing 18 is always circulated through the sliding surface 18a of the thrust bearing 18 and the sliding surface 22b of the thrust plates 22, and thereby the lubricating properties of the thrust bearing are improved.

Figure 6:
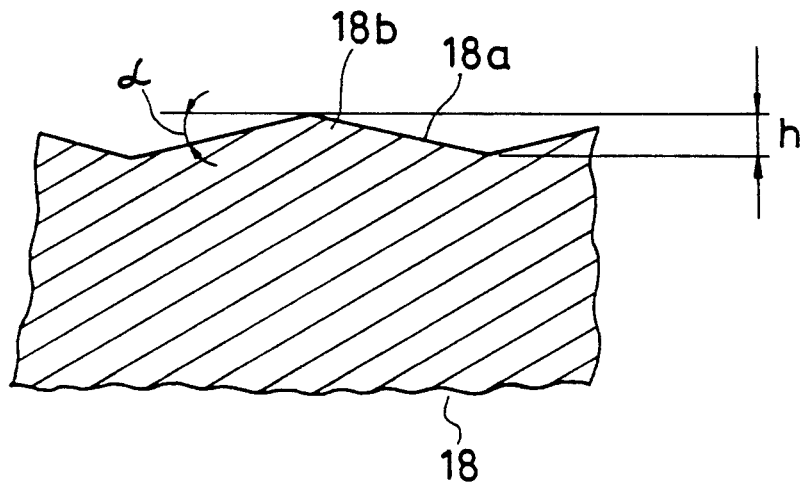
FIG. 6 is a cross-sectional view in a circumferential direction of the thrust bearing in accordance with the present invention showing an embodiment of protrusions formed on a thrust bearing surface.
Figure 7:
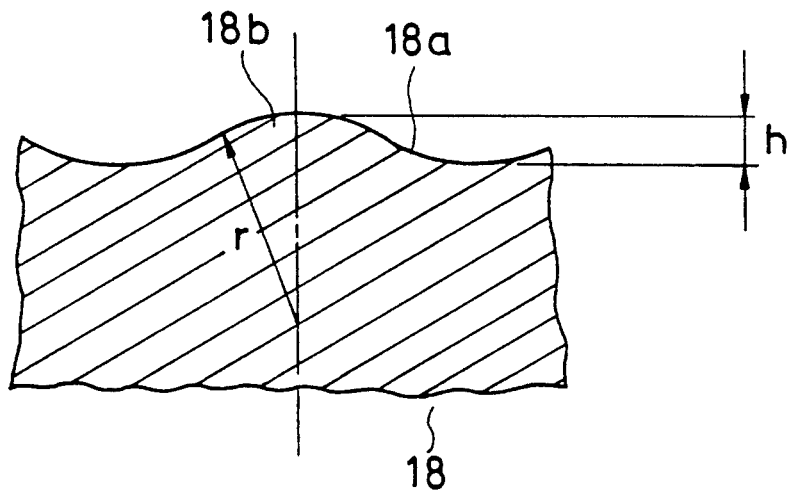
FIG. 7 is a cross-sectional view in a circumferential direction of the thrust bearing in accordance with the present invention showing another embodiment of the protrusions.
Figure 8:
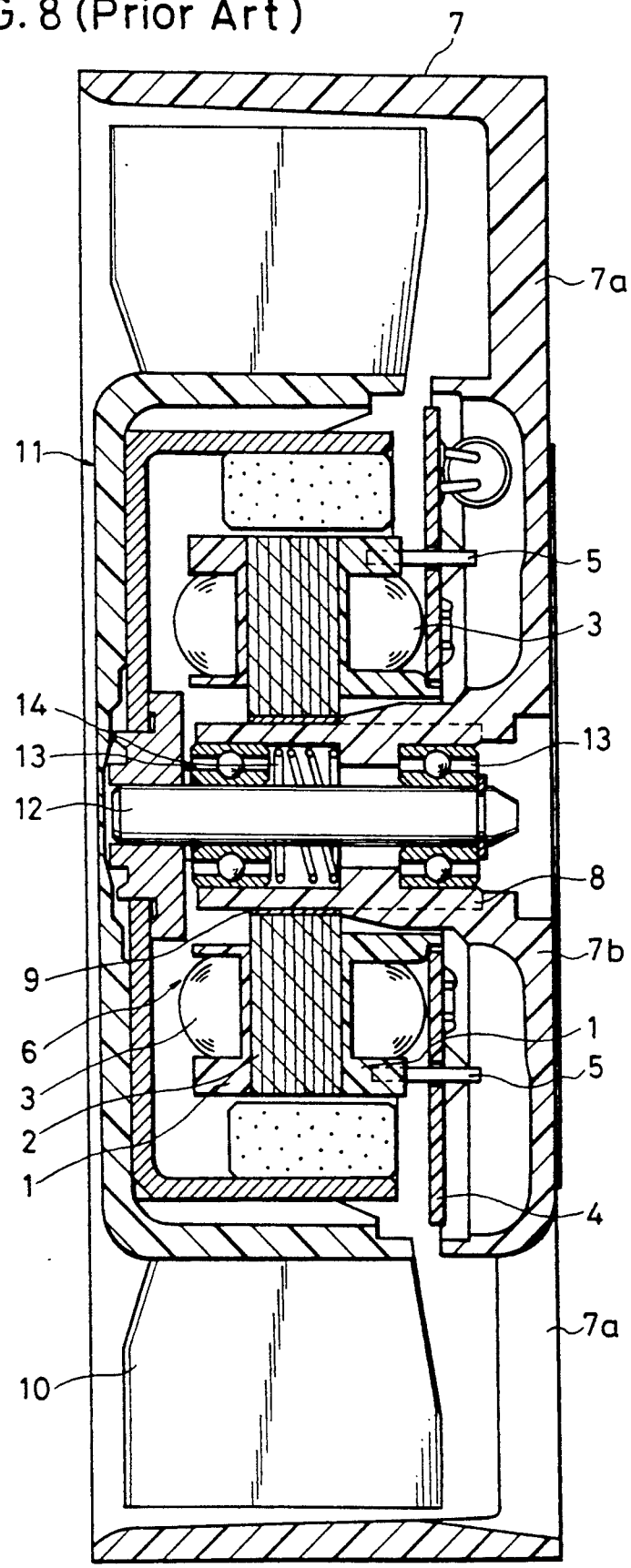
FIG. 8 is the cross-sectional side view showing the detailed constitution of the conventional commutatorless axial-flow fan motor.

Detailed configuration of the protrusions 18b of the bearing 18 is shown in FIG. 6 or 7. FIG. 6 is a cross-sectional view in the circumferential direction showing the detailed constitution of an embodiment of the protrusions 18b. FIG. 7 is a cross-sectional view in the circumferential direction showing the detailed constitution of another embodiment of the protrusions 18b.

Through experiments of the lubricating property and the life-time of the bearing, the bearing having one of or a combination of the following conditions is confirmed to be most suitable with regard to lubrication and long service time.

(1) The height "h" of the protrusions 18b shown in FIGS. 6 and 7, which is the height in the axial direction of the rotation shaft 12 of the rotor assembly 11, is in the range of 10–30 $\mu$m.

(2) The inclination angle "$\alpha$" of the protrusion 18b, which is shown in FIG. 6, on the thrust bearing surface of the bearing 18 is in the range of 2–20 $\mu$m/mm.

(3) The curvature "r" of the protrusion 18b, which is shown in FIG. 7, is 50 $\mu$m or larger.

As mentioned above, in the axial-flow fan motor in accordance with the present invention, at least three protrusions 18b are formed on the thrust bearing surface 18a of the sleeve-type plain bearing 18 which is made of the sintered oilless metal. And the thrust plate 22, which is fixed on the rotation shaft 12 of the rotor assembly 11 and rotated with the rotor assembly 11, slides and contacts on the thrust bearing surface 18a of the bearing 18. As a result, the oil impregnated in the sintered oilless metal is always supplied in the spaces between the thrust bearing surface 18a of the bearing 18 and the thrust plate 22. Accordingly, the lubrication property of the bearing is improved and the load-proof of the bearing is increased. The rotation of the rotation shaft 12 is lubricated by the oil so as to maintain small friction resistance between the rotation shaft 12 (or thrust plate 22) and the bearing 18, to minimize the wear of the rotation shaft 12 or the bearing 18. Thereby, the axial-flow fan motor in accordance with the present invention is usable for a long time service. In particular, when the axial-flow fan motor in accordance with the present invention is used in an environment of high temperature, stability of lubricating properties of the axial-flow fan motor is maintained for long service time since it uses the sleeve-type plain bearing 18 for bearing the rotation shaft 12 of the rotor assembly 11.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as falling within the true spirit and scope of the invention.

What is claimed is:

1. An axial-flow fan motor comprising:
   a cylindrical-shaped housing forming an outer shell of the axial-flow fan motor;
   a motor holder on a center part of said housing, said holder being held on said housing by a plurality of spokes and having a cylindrical boss part;
   sleeve-type plain bearing means provided on said boss part of said motor holder, for bearing a rotation shaft of a rotor and having at least three protrusions spaced by substantially equal angles on a thrust bearing surface thereof, said sleeve-type plain bearing means being made of a sintered metal impregnated with oil; and
   a thrust plate provided on said rotation shaft for sliding on said thrust bearing surface of said sleeve-type plain bearing;
   said at least three protrusions producing positive pressure parts and negative pressure parts in an oil flow flowing between said thrust bearing surface and said thrust plate, thereby circulating the oil impregnated in said sleeve-type plain bearing means through said thrust bearing surface and said thrust plate.

2. An axial-flow fan motor in accordance with claim 1, wherein
   heights of said protrusions are in a range of 10–30 $\mu$m.

3. An axial-flow fan motor in accordance with claim 1, wherein
   inclination angles of said protrusions are in a range of 2–20 $\mu$m/mm.

4. An axial-flow fan motor in accordance with claim 1, wherein
   curvature of said protrusions in a direction parallel to an axial direction of said rotation shaft are at least 50 $\mu$m.

5. A bearing for an axial-flow motor, said bearing comprising:

a bearing body made of sintered metal and impregnated with oil;

a thrust bearing surface disposed at one end of said bearing body;

a thrust plate which is to be fixed on a rotation shaft of said rotor; and at least three protrusions disposed on said thrust bearing surface;

said at least three protrusions producing positive pressure parts and negative pressure parts in an oil flow flowing between said thrust bearing surface and said thrust plate, thereby circulating the oil impregnated in said bearing body through said thrust bearing surface and said thrust plate.

6. The bearing of claim 5, wherein heights of said protrusions are in a range of 10-30 $\mu$m.

7. The bearing of claim 5, wherein inclination angles of said protrusions are in a range of 2-20 $\mu$m/mm.

8. The bearing of claim 5, wherein curvature of said protrusions in a direction parallel to an axial direction of said rotation shaft are at least 50 $\mu$m.

9. The bearing of claim 5, wherein said protrusions are spaced by substantially equal angles on said thrust bearing surface.

* * * * *